United States Patent
Gunnin et al.

(10) Patent No.: US 12,099,835 B1
(45) Date of Patent: Sep. 24, 2024

(54) SEMANTIC ANALYSIS OF SOURCE CODE USING STUBS FOR EXTERNAL REFERENCES

(71) Applicant: Black Duck Software, Inc., Sunnyvale, CA (US)

(72) Inventors: Cameron Gunnin, Kawasaki (JP); Edward Moriarty, Calgary (CA); Aaron Hurst, San Francisco, CA (US); Simon Fredrick Vicente Goldsmith, Oakland, CA (US)

(73) Assignee: Black Duck Software, Inc., Sunnyvale, CA (US)

( * ) Notice: Subject to any disclaimer, the term of this patent is extended or adjusted under 35 U.S.C. 154(b) by 111 days.

(21) Appl. No.: 17/686,892

(22) Filed: Mar. 4, 2022

Related U.S. Application Data (60) Provisional application No. 63/156,620, filed on Mar. 4, 2021.

(51) Int. Cl.
  *G06F 8/75* (2018.01)
  *G06F 8/41* (2018.01)
  *G06F 8/73* (2018.01)
  *G06N 5/01* (2023.01)

(52) U.S. Cl.
  CPC ............ *G06F 8/75* (2013.01); *G06F 8/436* (2013.01); *G06F 8/73* (2013.01); *G06N 5/01* (2023.01)

(58) Field of Classification Search
  CPC .................................. G06F 8/436; G06F 8/75
  USPC ......................................................... 717/123
  See application file for complete search history.

(56) References Cited

U.S. PATENT DOCUMENTS

| | | | | |
|---|---|---|---|---|
| 5,590,331 A | * | 12/1996 | Lewis | G06F 8/54 717/146 |
| 7,249,235 B2 | * | 7/2007 | Sexton | G06F 11/366 711/170 |
| 8,296,745 B2 | * | 10/2012 | Simon | G06F 8/443 717/148 |
| 8,407,675 B1 | * | 3/2013 | Clark | G06F 8/52 717/137 |
| 9,146,842 B2 | * | 9/2015 | Herron | G06F 11/3684 |
| 10,013,242 B2 | * | 7/2018 | Bezalel | G06F 8/41 |
| 10,203,968 B1 | * | 2/2019 | Lawson | G06F 8/53 |

(Continued)

FOREIGN PATENT DOCUMENTS

| | | | |
|---|---|---|---|
| CN | 103399741 A | * | 11/2013 |
| JP | 2012048660 A | * | 3/2012 |

(Continued)

OTHER PUBLICATIONS

CN 103399741 A (Text English Translation).*

(Continued)

*Primary Examiner* — Francisco J Aponte
(74) *Attorney, Agent, or Firm* — Fenwick & West LLP (57) ABSTRACT

A system receives source code for analysis. The system identifies external references to reference code in source code. The reference code is not included in the source code received for analysis. The system generates code stubs corresponding to the external references. Each code stub describes a semantic context for the corresponding external reference. The system provides the set of source code and the one or more code stubs for analysis of the code, for example, using a code analysis tool.

20 Claims, 3 Drawing Sheets

(56) References Cited

U.S. PATENT DOCUMENTS

| | | | | |
|---|---|---|---|---|
| 10,303,466 | B1* | 5/2019 | Karman | G06F 8/73 |
| 11,758,010 | B1* | 9/2023 | Tamilselvam | G06F 40/30 |
| | | | | 709/203 |
| 2013/0086563 | A1* | 4/2013 | Blainey | G06F 8/443 |
| | | | | 717/140 |
| 2013/0086570 | A1* | 4/2013 | Blainey | G06F 9/3017 |
| | | | | 717/165 |
| 2013/0311979 | A1* | 11/2013 | Baumgart | G06F 8/54 |
| | | | | 717/140 |
| 2016/0299748 | A1* | 10/2016 | Scholz | G06F 8/427 |
| 2019/0163446 | A1* | 5/2019 | Brunel | G06F 8/74 |
| 2020/0218634 | A1* | 7/2020 | Jones | G06F 11/3616 |
| 2021/0011693 | A1* | 1/2021 | Williamson | G06F 8/75 |
| 2023/0029250 | A1* | 1/2023 | Abdelaziz | G06N 5/04 |

FOREIGN PATENT DOCUMENTS

| | | | | | |
|---|---|---|---|---|---|
| WO | WO-2016148762 | A1 * | 9/2016 | | G06F 8/443 |
| WO | WO-2019003252 | A1 * | 1/2019 | | G06F 11/368 |
| WO | WO-2022140014 | A1 * | 6/2022 | | G06F 21/16 |

OTHER PUBLICATIONS

NPL English Text Translation for Foreing Patent Documents.*
Pratik Fegade and Christian Wimmer. 2020. Scalable Pointer Analysis of Data Structures using Semantic Models. In Proceedings of the 29th International Conference on Compiler Construction (CC '20), Feb. 22-23, 2020, San Diego, CA, USA. ACM, New York, NY.*
Raphaël Monat, Abdelraouf Ouadjaout, Antoine Miné. A Multilanguage Static Analysis of Python Programs with Native C Extensions. Static Analysis Symposium (SAS), Oct. 2021, Chicago, Illinois, United States.*
Leandro T. C. Melo, Rodrigo G. Ribeiro, Marcus R. de Araújo, and Fernando Magno Quintão Pereira. 2018. Inference of Static Semantics for Incomplete C Programs. Proc. ACM Program. Lang. 2, POPL, Article 29 (Jan. 2018), 28 pages.*
Sushil Bajracharya et al. "Sourcerer: An infrastructure for large-scale collection and analysis of open-source code"; Science of Computer Programming 79 (2014) 241-259—Science of Computer Programming—University of California, Irvine, CA, USA.*

* cited by examiner

SEMANTIC ANALYSIS OF SOURCE CODE USING STUBS FOR EXTERNAL REFERENCES

CROSS REFERENCE TO RELATED APPLICATIONS

This application claims a benefit of U.S. Patent Application Ser. No. 63/156,620, filed Mar. 4, 2021, the contents of which are incorporated by reference herein in its entirety.

TECHNICAL FIELD

The present disclosure relates to code analysis of source code including external references and particularly to improving semantic understanding of the code by including one or more stubs in the semantic analysis.

BACKGROUND

Development tools that operate on source code perform bug-finding static analysis, linters and API checks, semantic code search, code refactoring, and software architecture extraction. The source code may be specified using a programming language such as C, C++, C #, Java, and so on. Analysis of the source code allows early determination of issues in the source code so that the issues can be addressed early. Source code analysis can be syntactic or semantic. The syntactic analysis determines whether the source code is well formed structurally. The semantic analysis concerns meaning of the source code.

SUMMARY

A system performs static source code analysis with semantic understanding of the source code without requiring full compilation of all the code. The system augments static analysis of source code by identifying externally referenced code not included in the source code and generating stubs that enable further semantic analysis of the source code than would be possible with the source code alone. This semantic analysis may be performed even though the referenced code is not included in the provided source code and executable versions of the source code may not be available.

According to an embodiment, the system receives source code for analysis. The system identifies external references to reference code in source code. The reference code is not included in the source code received for analysis. The system generates code stubs corresponding to the external references. Each code stub describes a semantic context for the corresponding external reference. The system provides the set of source code and the one or more code stubs for a code analysis tool.

The techniques disclosed improve the efficiency of tools such as static analysis tools since full compilation of the reference code is not performed. Accordingly, the analysis is performed with fewer computing resources for example, fewer processing and memory resources. Furthermore, the static analysis process is less cumbersome and simplified since complexity of the reference code is reduced and as a result, fewer developer resources are required to handle the simplified code.

According to an embodiment, the system generates the code stubs by retrieving information for an external reference from a code repository corresponding to the external reference.

According to an embodiment, at least one of the code stubs is generated prior to receiving the set of source code for analysis. The code stub may be selected from a set of stubs based on a set of heuristics. Examples of the heuristics include one or more of: (1) determining a set of types used by the set of source code, (2) for each of a plurality of stubs, determining a set of types defined in the stub, and (3) selecting a stub that matches the most types used by the source code.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Development tools that perform analysis of code receive source code text as an essential input. These tools benefit from additional knowledge of the compilation process and from knowledge of libraries and other information referenced by but not included in the source code. This context informs how different portions of source code relate to each other, and for many languages it is necessary for precise semantic understanding. Compiling source code is also extremely complicated. There are often only a few individuals, for any given portion of source code, that understand how to compile it. However, tools for analyzing software that do not compile the code typically lose precise semantic understanding provided by the compilation. Accordingly, the analysis cannot benefit from precise semantic understanding provided by the compilation. This causes such analysis lacking semantic information to yield imprecise results, including false positive reports, missed defects, and misleading explanations.

Aspects of the present disclosure relate to analyzing code lacking a build environment or dependencies. A code analysis system augments static analysis of source code by identifying externally referenced code not included in the source code and generating stubs that enable further semantic analysis of the source code than would be possible with the source code alone. This semantic analysis may be performed even though the referenced code is not included in the provided source code and executable versions of the source code may not be available. Semantic analysis is typically performed after parsing the source code to gather necessary semantic information from the source code. Semantic analysis makes sure that declarations and statements of program are semantically correct. It may be implemented as a collection of procedures that are called by parser as and when required by grammar. Both syntax tree of a syntactic analysis phase and a symbol table are used to check the consistency of the given code. Examples of semantic analysis include type checking, for example, checking that the type of an expression matches the type of a variable to which the result of the expression is assigned, checking that the uses of a variable are consistent with the declaration of the variable, checking that each operator has matching operands, performing flow control check to determine that control structures are used in a proper manner (for example, there are no break statements outside a loop) and so on.

An advantage of the process discussed herein is to avoid complete compilation of an executable program while providing enough information for a meaningful semantic analysis of the parsed code. This solution enables more precise analysis of such source code and enables a simpler user workflow for code analysis (enabling a user to submit a package of developed source code without external references or additional compilation options). Sufficient information may thus be provided as needed when the source code is parsed in its original form and may not require compensation at a subsequent time. This allows detailed semantic analysis of the source code in an efficient manner such that fewer computational resources such as processing resources and memory resources are consumed during the analysis.

Figure 1:
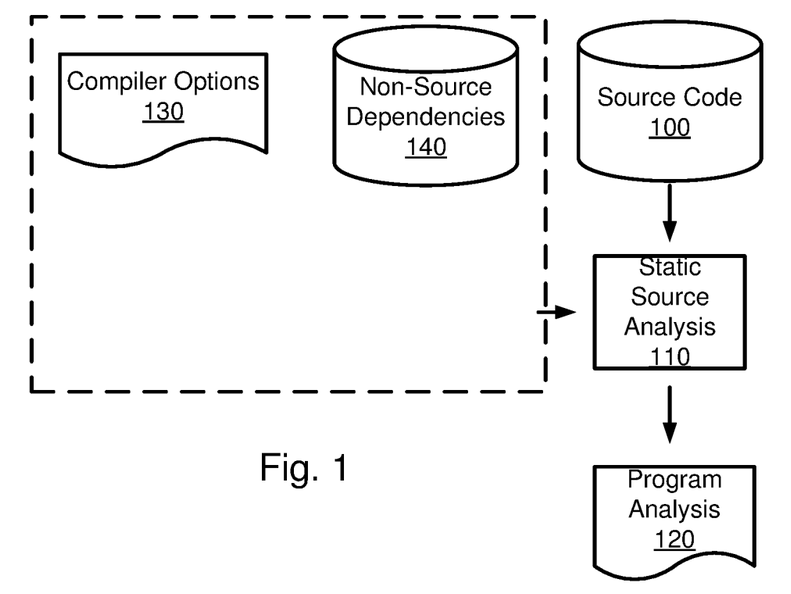
FIG. 1 illustrates automated static source analysis performed by a computing system according to one embodiment.

FIG. 1 illustrates automated static source analysis performed by a computing system according to one embodiment. An example machine for performing static analysis is described with respect to FIG. 4. The source code 100 is provided for analysis for determining relevant errors and potential issues. In performing static source code analysis 110, the source code is analyzed to determine potential errors of the program that would be generated by the source code (e.g., were it compiled) without execution of the computer program. Though static analysis is referenced here, the present disclosure may apply to many types of program analysis 120 that uses a semantic understanding of the source code as also discussed below.

Typically, compilation of the source code 100 to an executable program requires additional information, such as the specific options 130 provided to the compiler and any dependencies 140 referenced by the source code 100. A dependency is any portion of source code that is referenced by and/or required for compilation and execution of the program of the source code 100. A dependency identified with respect to a particular set of source code 100 are also referred to herein as an "external reference." These dependencies include libraries or references to content that is not included with source code 100 and may include APIs, object definitions, function calls, and so forth that may not be included in source code 100.

As discussed above, this disclosure specifically addresses how to compensate for missing dependencies in the compilation context. For languages that require knowing about type definitions, these dependencies are necessary to fully resolve symbolic references, such as type names, function calls, and variable definitions. Note that this disclosure applies generally to many languages but gives concrete examples for C #and Java.

A code analysis system augments static analysis of source code by identifying externally referenced code not included in the source code 100 and generating stubs that enable further semantic analysis of the source code than would be possible with the source code 100 alone. This semantic analysis may be performed even though the referenced code is not included in the provided source code and executable versions of the source code may not be available.

To illustrate the benefits for semantic analysis, e.g., type checking, consider the following example programming statements:
(1) x=new ReferenceType( )
(2) x.y=5;
(3) x.z( );
(4) myValue=x.z(a, b, c);

In the above examples, without an understanding of the type of object of "ReferenceType" and its constituent fields, the analysis cannot determine effectively whether statements (1)-(4) are proper and whether they cause any downstream problems. In this example, the analysis cannot perform type checking to determine, for example, whether in (1) the new ReferenceType object may be constructed without arguments. In (2) whether it would be proper to set element "y" in object x to the value 5. In some programming languages, such as C #, a programming statement using an assignment operator may appear the same as written in (2) but may operate differently depending on the type of y. For example, for certain types of variables in the C #programming language, a variable of an object may be directly accessed or assigned or may be a defined as a "property" that is accessed and assigned with "get" and "set" functions, which are automatically invoked when the field is accessed or an assignment operator is applied. Thus, depending on the type of ReferenceType (and its definition for y), example (2) may assign a value directly or may invoke a Set( ) function of the corresponding variable. In example (3) and (4), without knowledge of the types for the relevant functions, it may not be possible to determine whether these functions are properly invoked and whether they return a value type that is properly used (e.g., that may be assigned to my Value in example (4)).

The system according to various embodiments uses stubs of such externally referenced objects to perform additional semantic analysis where the referenced objects are not included with the source code for analysis. Stated another way, while the content of the external references may be required for compilation and successful execution of a program from the source code, the stubs discussed below allow for additional analysis of the source code without access to the external references as part of the provided source code. The stubs may thus provide information for semantic analysis to improve static and other analysis of a program. For example, the stubs may be used for additional contextual analysis, type checking, scope resolution, and update a parse tree as discussed below.

Rather than use a full definition of the dependencies, the analysis system identifies and substitutes stubs in place of full dependency definitions for the purpose of analyzing the source code with reference to the stubbed dependency. In one example, the analysis can include partial or full compilation of the source code using the stubbed dependency and analyze the compiled source code based on the stubbed dependencies. As discussed herein, a stub is supplemental information describing an external reference that is necessary to compile source code including the external reference, but not sufficient to execute the referenced code. For example, the stub may include only type definitions, but no method bodies. Depending on the programming language, the exact information in a stub can vary. For C++, a stub could refer to header files containing type declarations. For C #and Java, a stub could refer to assemblies or class files that contain type definitions without method bodies. Thus, stubs can be small and provide all the information necessary for compiling the user code and thus enable more semantic analysis and understanding of the code. Stubs can be included alongside code analysis tools for little cost and may also avoid licensing complications attached to copyrighted third-party code (e.g., in which the external reference is to such third-party code).

Figure 2:
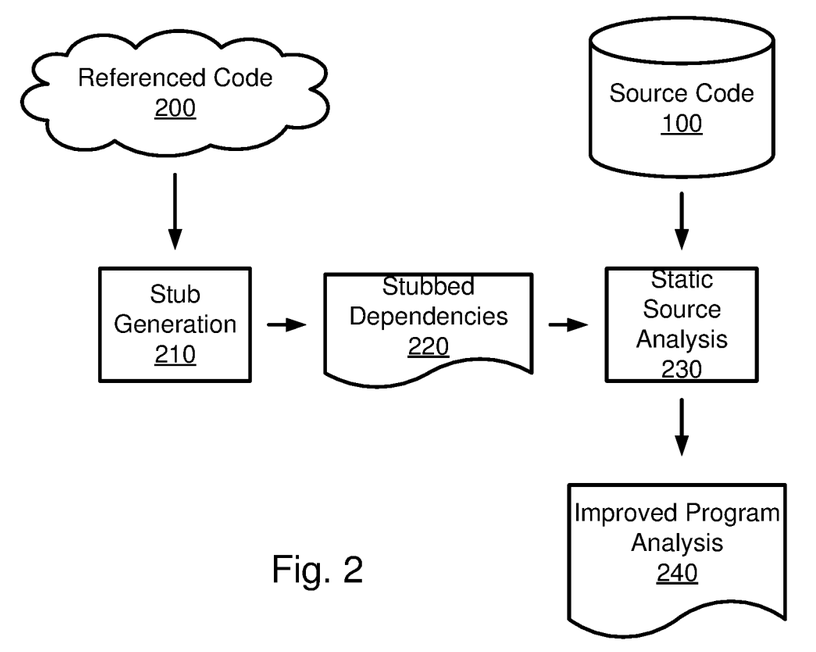
FIG. 2 illustrates a static analysis including stubbed dependencies, according to one embodiment.

FIG. 2 illustrates a static analysis including stubbed dependencies, according to one embodiment. The process of using stubs can be broken down into three general steps. First, when the source code 100 is received, the source code 100 is analyzed to identify external references which represent dependencies for compiling the source code 100. Second, referenced code 200 identified by the external references is identified and a stub generation process 210 generates stubbed dependencies 220 with the referenced code 200. Finally, the stubbed dependencies 220 are integrated with the source code 100 to supply the information normally provided by the dependencies to the static source analysis 230. The result is improved usability with an enhanced understanding of user source code by code analysis tools and an improved program analysis 240.

Figure 3:
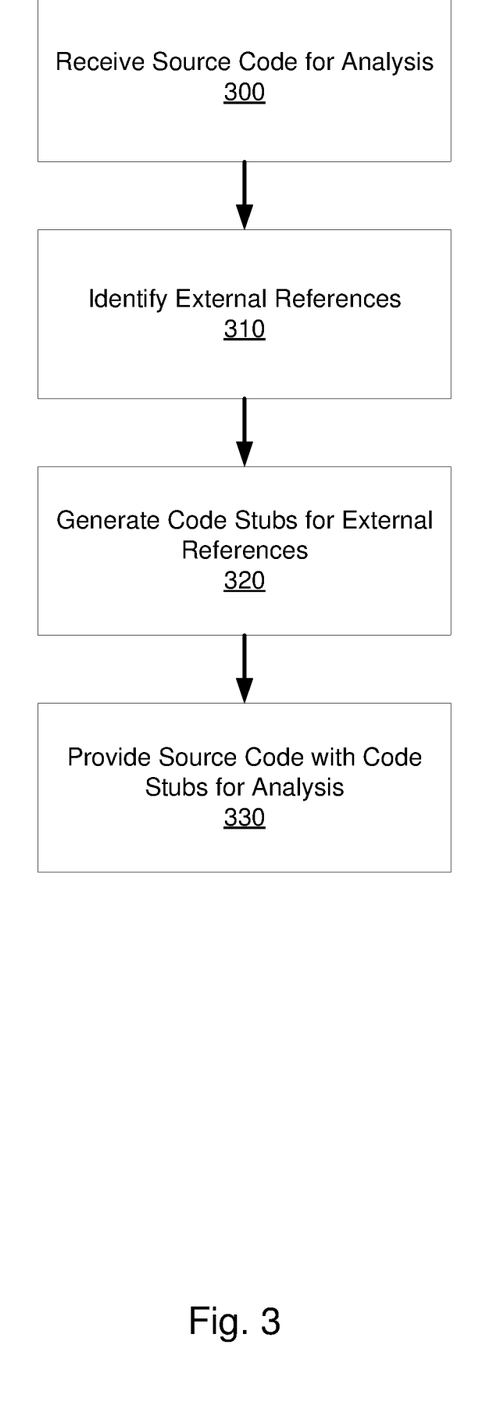
FIG. 3 illustrates an example flowchart illustrating this process according to one embodiment.

FIG. 3 illustrates an example flowchart illustrating this process according to one embodiment. As noted, this process and the code analysis may be performed by a computing system shown in FIG. 4 and discussed below. First, the source code is received 300 for analysis. Next, the source code is analyzed to identify 310 external references within the source code to dependencies that are not included in the source code. Code stubs are generated 320 for the external references. As discussed below, code stubs may be generated for a variety of code that may be referenced, such that the code stubs are generated before a specific set of source code that references code for a particular stub. Finally, the source code is provided 330 for analysis using the additional semantic information that may be determined based on the code stubs. This additional analysis may be static code analysis and may include any semantic analysis that benefits from inclusion of the stubbed dependencies, which may or may not include compiling the source code 100 with the stubbed dependencies 220. For example, the analysis may include analysis based on knowledge of the library or version thereof of the stubbed dependency (e.g., knowledge that a function or object with a given name typically has a certain function within a library of referenced code, such as access to a socket, file, or database access requests). As additional examples, the semantic analysis may include name checking, linting, semantic code search, code refactoring, code metrics, semantic queries, and so forth. In general, the stubbed dependencies may be used for semantic resolution of the source code 100 with missing dependencies. Each of these processes is discussed in more detail below.

Identifying Libraries to Stub

To generate stubbed dependencies 220, the code analysis system crawls and indexes public collections of library sources and binaries to potential stub targets. In some circumstances the collections may be identified and a dependency stubbed after an external reference is identified in the source code; in other examples such public collections may be stubbed before specific source code references it. Some examples of such collections include the Maven central repository, the NuGet Gallery, and other publicly-available repositories/collections. These are the canonical sources of third-party library code, and many projects utilize these as the exclusive source of library dependencies. Most widely used libraries appear in the popular repositories.

In one embodiment, all libraries in a repository are parsed and stubbed to generate a "stub library" that may be matched to specific external references in particular source code. This may provide for an offline and/or on-demand set of stubs. It may also be used for a centralized analysis, such as a software-as-a-service (SaaS) system.

In another embodiment, only certain libraries available at these collections/repositories are stubbed. The libraries to be stubbed may be selected by applying a filter or other selection criteria and used to reduce the storage requirements or other processing requirements for the stubbed dependencies. As example filters, for selecting which libraries to stub, the system may filter by library popularity, version recency, and deprecation status.

Another example of a useful filter is based on expected benefit to downstream code analysis. The libraries/methods that are most useful to stub (and therefore analyze with increased fidelity) are those symbols whose type definitions, call resolution, and type inheritance relationships are understood by the analysis and play a role in determining what is and is expected to flag a concern in the analysis. Other symbols can mostly be substituted with dummy placeholders or left unresolved, with a lesser effect on the analysis.

As one example for selecting libraries based on expected analytical benefit is to extract names and/or regular expressions that match known symbols and then use the extracted names select library classes or methods for stubbing. In one example, symbol names may be encoded in analytic tool implementation or in tool data files. As one example, a static analysis tool may include a built-in model database that contains a set of classes and methods that have been modeled to have impacts on the analysis output. These classes and methods may be used to select libraries and other classes/methods from a code repository (e.g., including referenced code 200) for which to generate stubbed dependencies 220.

Stub Generation and Packaging

The process for creating stubs varies for each language. In C #, the C #compiler may directly generate "ref assemblies" that contain only the necessary information to compile dependent C #source code. In Java, no such tool exists. However, in both languages, tools for inspecting the metadata exist and can be used to generate type definitions without method bodies, which may be used as stubbed dependencies.

In addition, since many dependencies may not be available as source code, for C #and Java (as with other languages) we are left with only bytecode to generate stubs from. Many tools already exist to decompile .NET and JVM bytecode to source code. However, only the public API surface is necessary to generate stubs, as this information is what is required when compiling source code, in particular the required type information for interfacing with the API. Because the stubs may use accessible types and members, omitting any method bodies and private implementation details, the size of the generated stubs can be greatly reduced. Stated another way, while libraries may include additional dependencies that reference additional libraries or additional portions of the same library, the stubbed dependencies in one embodiment are generated only for the externally referenced (or referenceable) APIs/access points to the library. This may greatly reduce the size of the stubs relative to the size of a library. In addition, the stubs may also be generated based on API documentation or other documentation describing interactions with a library or other referenced code 200.

Utilizing Stubs in Source Code Analysis (and Related Applications)

The process to utilize the stubs varies depending on the programming language and specific analysis used, but the concept remains the same: provide type definitions for otherwise missing dependencies. The process in which the type definitions are provided depends on the requirements of the analytical tool consuming them. In one example, the type information is provided in a format native to the language, such as source code or bytecode. In another format, the symbol resolution is augmented directly with the additional type information when the source code is parsed. As another example, the symbol resolution for external references may be deferred until a post-pass after parsing. As another example, the stubs may be converted to standard library formats (although missing implementation details), converting the missing external references into references that are made available in the stubbed library. In another example, the source code analysis/parsing may construct a call graph in which additional call resolution are indicated by the stubbed dependencies.

Missing type definitions can cause compilation issues any place in source code that the missing type is referenced. In C++, C #, and Java, some examples are the base class or interface lists when declaring a new class, the types of fields and parameters, return types. Missing type definitions can also cause downstream compilation issues when referencing a member of a missing type. Using stubs may prevent these types of compilation issues.

Also, for some programming languages, like Java, if more than one dependency defines a specific type, the rules of the compiler say to pick the first one. For these languages, the stubs may simply be appended to the end of all other supplied dependencies. For other languages, like C++ and C #, all type definitions are considered equal, thus, if two exist, an ambiguous type error will occur. For these languages, a stub may be omitted when a conflict arises.

Figure 4:
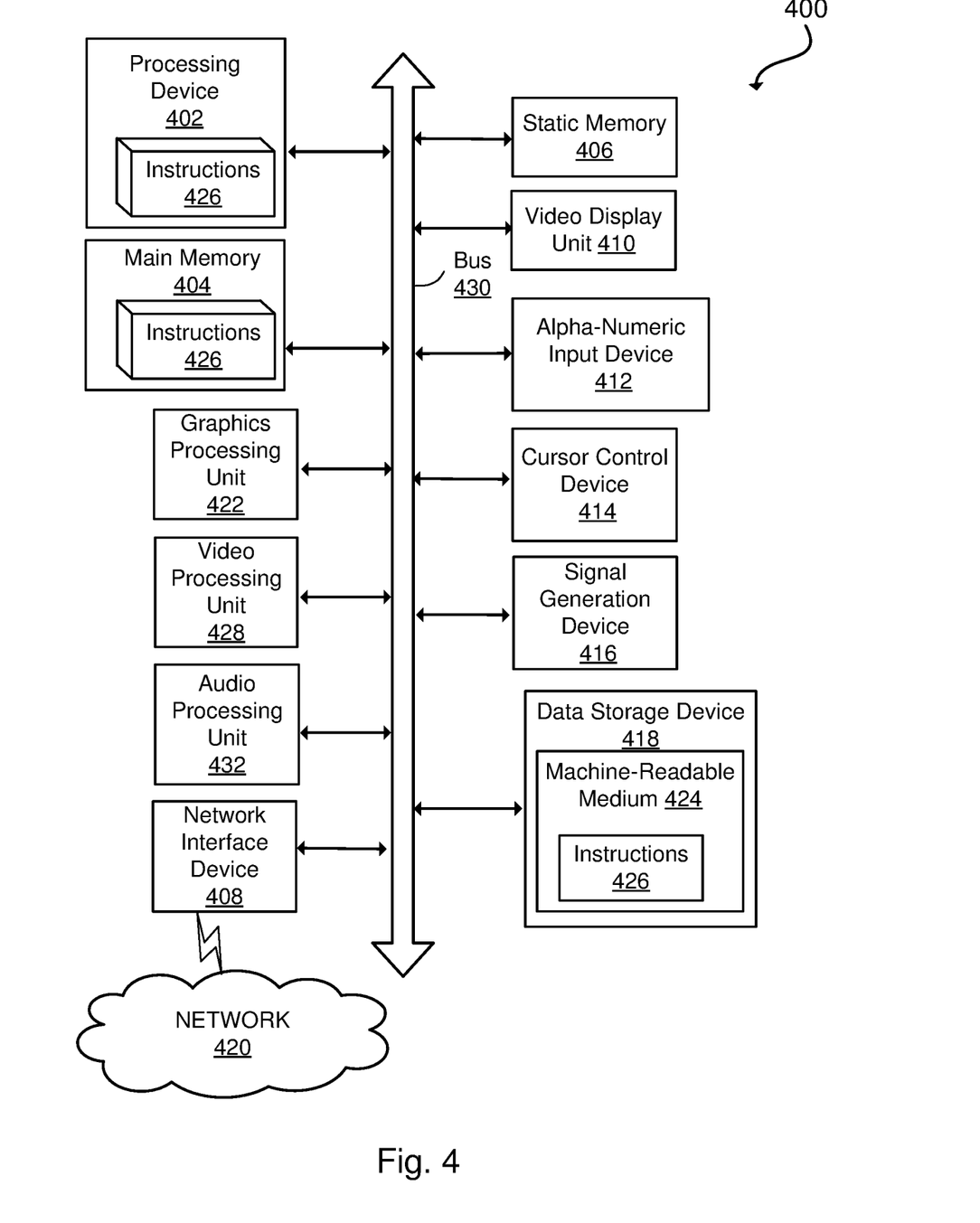
FIG. 4 depicts a diagram of an example computer system in which embodiments of the present disclosure may operate.

In another example, when a conflict appears, a heuristic may be applied to determine which stubbed dependency to use. As one example, the code analysis system may determine the set of types used by the code being compiled. The code analysis system further determines the set of types defined in each stub and uses the stub that matches the most types used by the code being analyzed. Accordingly, the code analysis system selects a stub that maximizes the number of types matching the types used by the source code Computer Architecture The process FIG. 4 illustrates an example machine of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 430.

Processing device 402 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 may be configured to execute instructions 426 for performing the operations and steps described herein.

The computer system 400 may further include a network interface device 408 to communicate over the network 420. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), a graphics processing unit 422, a signal generation device 416 (e.g., a speaker), graphics processing unit 422, video processing unit 428, and audio processing unit 432.

The data storage device 418 may include a a non-transitory computer-readable medium on which is stored one or more sets of instructions 426 or software embodying any one or more of the methodologies or functions described herein. The instructions 426 may also reside, completely or at least partially, within the main memory 404 and/or within the processing device 402 during execution thereof by the computer system 400, the main memory 404 and the processing device 402 also constituting machine-readable storage media.

In some implementations, the instructions 426 include instructions to implement functionality corresponding to the present disclosure. While the machine-readable storage medium 424 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    receiving a set of source code for analysis;
    identifying one or more external references to reference code in the set of source code, the reference code not included in the set of source code for analysis;
    for each of the one or more external references, retrieving information for the external reference from a code repository corresponding to the external reference;
    generating, by a processor, one or more code stubs each corresponding to the one or more external references, each code stub describing a semantic context for the corresponding external reference based on the retrieved information corresponding to the external reference; and
    performing analysis of the set of source code and a code stub selected from a set of code stubs responsive to determining that the code stub maximizes a number of types defined in the code stub that match types used in the set of source code.

2. The method of claim 1, wherein the set of source code and one or more code stubs is analyzed by a code analysis tool without compiling the source code.

3. The method of claim 1, wherein the one or more code stubs are sufficient to compile the set of source code to an executable but do not implement logic of one or more external references.

4. The method of claim 1, wherein at least one of the one or more code stubs is generated prior to receiving the set of source code for analysis.

5. The method of claim 4, wherein the at least one of the one or more code stubs is selected from a set of stubs based on a set of heuristics.

6. The method of claim 1, wherein the semantic context of a code stub describes a type, field, function, or scope of the corresponding external reference.

7. The method of claim 1, wherein the semantic context of a code stub describes metadata about a library of the corresponding external reference.

8. A system comprising:
    a memory storing instructions; and
    a processor, coupled with the memory and to execute the instructions, the instructions when executed cause the processor to:
        receive a set of source code for analysis;
        identify one or more external references to reference code in the set of source code, the reference code not included in the set of source code for analysis;
        for each of the one or more external references, retrieve information for the external reference from a code repository corresponding to the external reference;
        generate one or more code stubs each corresponding to the one or more external references, each code stub describing a semantic context for the corresponding external reference based on the retrieved information corresponding to the external reference; and
        performing analysis of the set of source code and a code stub selected from a set of code stubs responsive to determining that the code stub maximizes a number of types defined in the code stub that match types used in the set of source code.

9. The system of claim 8, wherein the set of source code and one or more code stubs is analyzed by a code analysis tool without compiling the source code.

10. The system of claim 8, wherein the one or more code stubs are sufficient to compile the set of source code to an executable but do not implement logic of one or more external references.

11. The system of claim 8, wherein at least one of the one or more code stubs is generated prior to receiving the set of source code for analysis.

12. The system of claim 11, wherein the at least one of the one or more code stubs is selected from a set of stubs based on a set of heuristics.

13. The system of claim 8, wherein the semantic context of a code stub describes a type, field, function, or scope of the corresponding external reference.

14. The system of claim 8, wherein the semantic context of a code stub describes metadata about a library of the corresponding external reference.

15. The system of claim 8, wherein the semantic context of a code stub describes a type, field, function, or scope of the corresponding external reference.

16. A non-transitory computer readable medium comprising stored instructions, which when executed by a processor, cause the processor to:
    receive a set of source code for analysis;
    identify one or more external references to reference code in the set of source code, the reference code not included in the set of source code for analysis;
    for each of the one or more external references, retrieve information for the external reference from a code repository corresponding to the external reference;
    generate one or more code stubs each corresponding to the one or more external references, each code stub describing a semantic context for the corresponding external reference based on the retrieved information corresponding to the external reference; and
    performing analysis of the set of source code and a code stub selected from a set of code stubs responsive to determining that the code stub maximizes a number of types defined in the code stub that match types used in the set of source code.

17. The non-transitory computer readable medium of claim 16, wherein the one or more code stubs are sufficient to compile the set of source code to an executable but do not implement logic of one or more external references.

18. The non-transitory computer readable medium of claim 16, wherein generating the one or more code stubs comprises retrieving information for an external reference from a code repository corresponding to the external reference.

19. The non-transitory computer readable medium of claim 16, wherein the semantic context of a code stub describes a type, field, function, or scope of the corresponding external reference.

20. The non-transitory computer readable medium of claim 16, wherein the semantic context of a code stub describes metadata about a library of the corresponding external reference.

* * * * *